(12) United States Patent
Saint-Jalmes et al.

(10) Patent No.: US 8,136,763 B2
(45) Date of Patent: Mar. 20, 2012

(54) FRONT PORTION FOR AN AIRCRAFT INCLUDING A REST COMPARTMENT FOR AT LEAST ONE PILOT

(75) Inventors: Bruno Saint-Jalmes, Toulouse (FR); Bernard Rumeau, Cornebarrieu (FR); Jason Zaneboni, Blagnac (FR); Bruno Alquier, Blagnac (FR); Jerome Javelle, Toulouse (FR); Joachim Voelkner, Erstetten (DE); Martin Geldien, Laupheim (DE)

(73) Assignees: Airbus, Blagnac (DE); Airbus Deutschland GmbH, Hamburg (DE)

( * ) Notice: Subject to any disclaimer, the term of this patent is extended or adjusted under 35 U.S.C. 154(b) by 357 days.

(21) Appl. No.: 12/520,915

(22) PCT Filed: Dec. 21, 2007

(86) PCT No.: PCT/FR2007/002149
§ 371 (c)(1),
(2), (4) Date: Jun. 23, 2009

(87) PCT Pub. No.: WO2008/102070
PCT Pub. Date: Aug. 28, 2008

(65) Prior Publication Data
US 2010/0059625 A1    Mar. 11, 2010

(30) Foreign Application Priority Data
Dec. 26, 2006 (FR) ...................... 06 11361

(51) Int. Cl.
*B64D 11/00* (2006.01)
*B64D 11/06* (2006.01)
*B64D 13/00* (2006.01)
(52) U.S. Cl. .................. 244/118.6; 244/118.5
(58) Field of Classification Search .............. 244/118.5, 244/118.6, 119, 129.4, 129.5, 129.1
See application file for complete search history.

(56) References Cited

U.S. PATENT DOCUMENTS
1,731,531 A    10/1929    Gott
(Continued)

FOREIGN PATENT DOCUMENTS
CN    2746063 Y    12/2005
(Continued)

OTHER PUBLICATIONS

Office Action issued Apr. 20, 2011 in China Application No. 200780048220.X (English Translation).

(Continued)

*Primary Examiner* — Timothy D Collins
*Assistant Examiner* — Nicholas McFall
(74) *Attorney, Agent, or Firm* — Oblon, Spivak, McClelland, Maier & Neustadt, L.L.P.

(57) ABSTRACT

A front portion of a fuselage of an aircraft including a cockpit, a washroom, an access corridor to the cockpit alongside the washroom, and a rest compartment with at least one berth for at least one pilot. The corridor alongside the washroom includes a mechanism separating the corridor from the cockpit and a door for blocking access to the passenger cabin. The rest compartment can be accessed from the access corridor to the cockpit, between the separation mechanism between the corridor and the cockpit and the corridor door. The washroom includes two access doors, a first access door for accessing the washroom from the access corridor to the cockpit in the area located between the separation mechanism between the corridor and the cockpit and the corridor door, and a second access door for accessing the washroom from the passenger cabin.

9 Claims, 4 Drawing Sheets

U.S. PATENT DOCUMENTS

Figure 1:
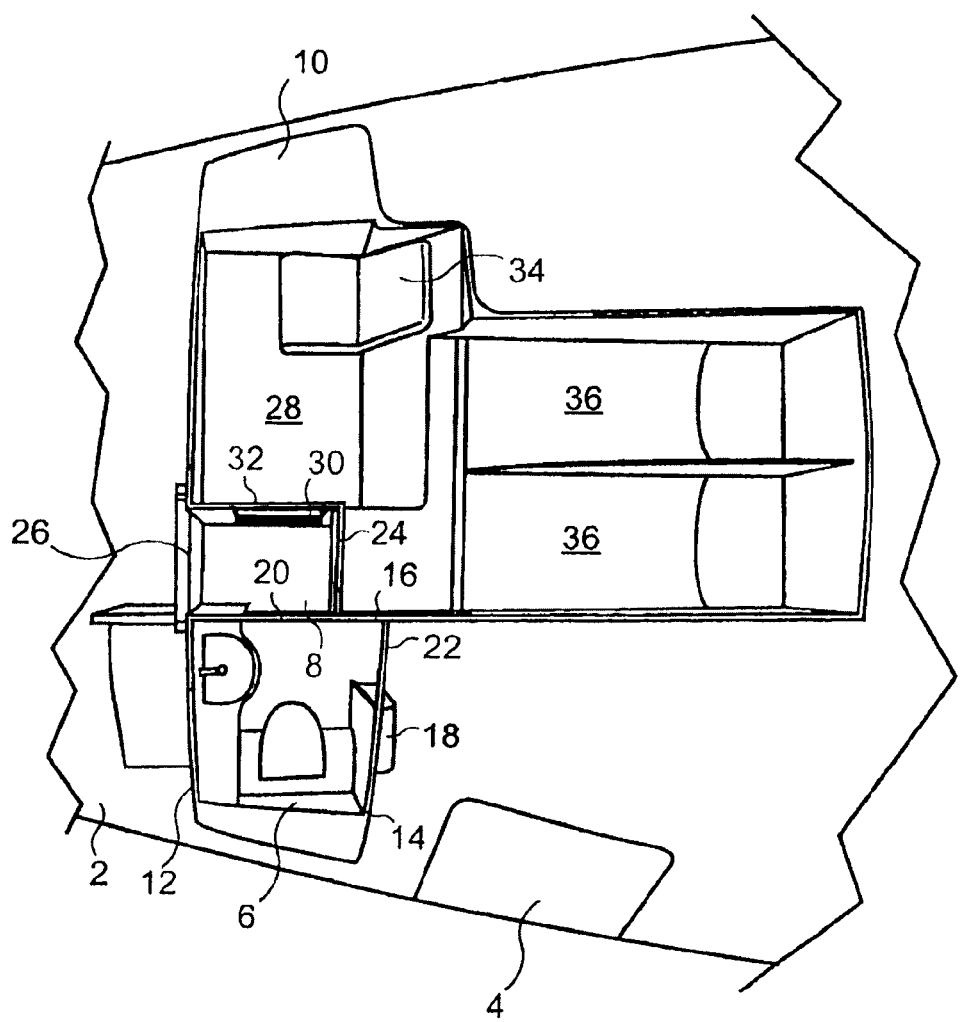

| | | |
|---|---|---|
| 2003/0066931 A1 | 4/2003 | Ward |
| 2003/0071743 A1 | 4/2003 | Seah et al. |
| 2003/0146347 A1 | 8/2003 | Roessner et al. |
| 2003/0169184 A1* | 9/2003 | Manten et al. ............... 340/945 |

FOREIGN PATENT DOCUMENTS

| | | |
|---|---|---|
| EP | 1 010 617 A2 | 6/2000 |
| EP | 1 332 965 | 8/2003 |
| RU | 2124459 | 1/1994 |

OTHER PUBLICATIONS

Russian Grant Decision mailed Oct. 5, 2011 in Russian Application No. 2009128683 (with English Language Translation).

* cited by examiner

FRONT PORTION FOR AN AIRCRAFT INCLUDING A REST COMPARTMENT FOR AT LEAST ONE PILOT

This invention relates to a front portion of an aircraft fuselage comprising a rest compartment for at least one pilot of the aircraft.

Since the events of Sep. 11, 2001, the safety of the pilots in an aircraft has been an important element in the design of the aircraft. It is advisable in particular to be able to prevent any unauthorized person from entering the cockpit and taking control of the aircraft. Prior to these events, the cockpit generally was separated from the cabin of the aircraft only by a non-reinforced door.

Furthermore, for long-haul flights, the pilots must take turns at the controls of the aircraft. In known manner, it then is provided to have a rest compartment in the aircraft. Thus, the document EP-1 010 617 discloses, for example, an embodiment of a rest compartment for aircraft pilots. In this document, it is provided to implement this rest compartment in the upper portion of the passenger cabin of the aircraft.

The embodiment proposed in this document of the prior art (and more generally the other known solutions) has the drawback of encroaching on the space normally provided for accommodating the passengers and the baggage accompanying them in the cabin. For this reason, the available space provided for generating income for the airline companies operating the aircraft is drastically reduced.

The solution proposed by this document of the prior art also has the drawback that the pilots must pass through the passenger cabin in order to get to the rest compartment or even the cockpit. For this reason, the pilots are vulnerable if ill-intentioned passengers are in the passenger cabin. Finally, the space available in the rest compartment of this document of the prior art is limited. It is noted in particular that a pilot wishing to change his clothes is unable to stand upright, which makes this change of clothes difficult.

The document EP-1 332 965 discloses a double-entrance security door access device for access to the cockpit of a transport airplane. The cockpit of this airplane communicates with the passenger cabin via an access zone and the double-entrance security door has a cylindrical conformation and can turn around its longitudinal axis inside a structure forming a frame being laid out inside the access zone. The double-entrance security door disclosed by this document has a double-entrance security door access, the opening of which coincides with at least two access/exit sectors of the structure forming a frame, the double-entrance security door access being able to be brought into a sector position selected from the access/exit sectors by rotation of the double-entrance security door around its longitudinal axis and locked in this position, while at the same time all the other access/exit sectors are barred to access/exit. The solution proposed here necessitates a very special layout which also is cumbersome in the space intended for the flight personnel of the airplane.

This invention then has as its purpose to provide a configuration of the front portion of an aircraft comprising a rest area for at least one pilot and allowing a secured access for the pilots between the cockpit and the rest area. This configuration preferably will make it possible not to encroach on the space in the passenger cabin. Advantageously, this rest area will provide great comfort for the pilots using it.

To this end, this invention proposes an aircraft fuselage front portion comprising a cockpit, a lavatory, an aisle for access to the cockpit running alongside the lavatory, and a rest compartment with at least one berth for at least one pilot, the aisle running alongside the lavatory comprising, on the one hand, means for separation of the aisle in relation to the cockpit and, on the other hand, a door making it possible to close off access to a passenger cabin, and access to the rest compartment being gained from the aisle for access to the cockpit, between the means for separation between the aisle and the cockpit and the said door of the aisle.

According to this invention, the lavatory comprises two access doors, a first access door allowing access to the lavatory from the aisle for access to the cockpit in the zone between the means for separation between the aisle and the cockpit and the said door of the aisle and a second access door making it possible to access the lavatory from the passenger cabin.

This configuration allows a novel management of the lavatory that can be used by the pilots and the passengers. In this configuration, however, the aisle running alongside the lavatory and the lavatory can come to enlarge the rest compartment access to which is gained through the said aisle.

In one embodiment allowing a good isolation of the rest area for the pilots (comprising not only the rest compartment but also sometimes the lavatory and the aisle running alongside it), the means for separation between the aisle for access to the cockpit and the cockpit consist of a second door of the corridor.

The access to the rest compartment, for example, faces the first door for access to the lavatory. As for the aisle for access to the cockpit, it is, for example arranged between, on the one hand, the lavatory and, on the other hand, a monument such as, for example, a storage module, another lavatory, a galley, etc. By monument there is understood here a structure fastened to the floor and usually referred to in the field of aviation by the English term "monument." In this embodiment, the monument can comprise a low compartment for the storage of carts, and a landing for access to the berth, at least one in number, is implemented, for example, in the monument above the compartment for storage of carts, the access landing being at a height intermediate between, on the one hand, the floor of the aisle for access to the cockpit and, on the other hand, the said berth. A second monument, arranged opposite the first monument and separated from the latter by an aisle crosswise in relation to the aircraft, then can serve as support for the berth, at least one in number, which extends, for example, above the crosswise aisle and above this second monument.

In order to be able to be used also during long-haul flights, the rest compartment preferably comprises two berths.

In order to ensure the safety of the pilots in the aircraft fuselage front portion according to the invention, it is provided, for example, that the doors and walls separating the lavatory, the cockpit and the rest compartment from the passenger cabin are reinforced. Advantageously, the first door for access to the lavatory and the wall surrounding it also is reinforced, because it can be a separation between the zone occupied by the pilots and the zone occupied by the passengers when the lavatory can be used by the passengers.

Finally, this invention also relates to an aircraft, characterized in that it comprises a fuselage front portion such as described above.

Figure 2:
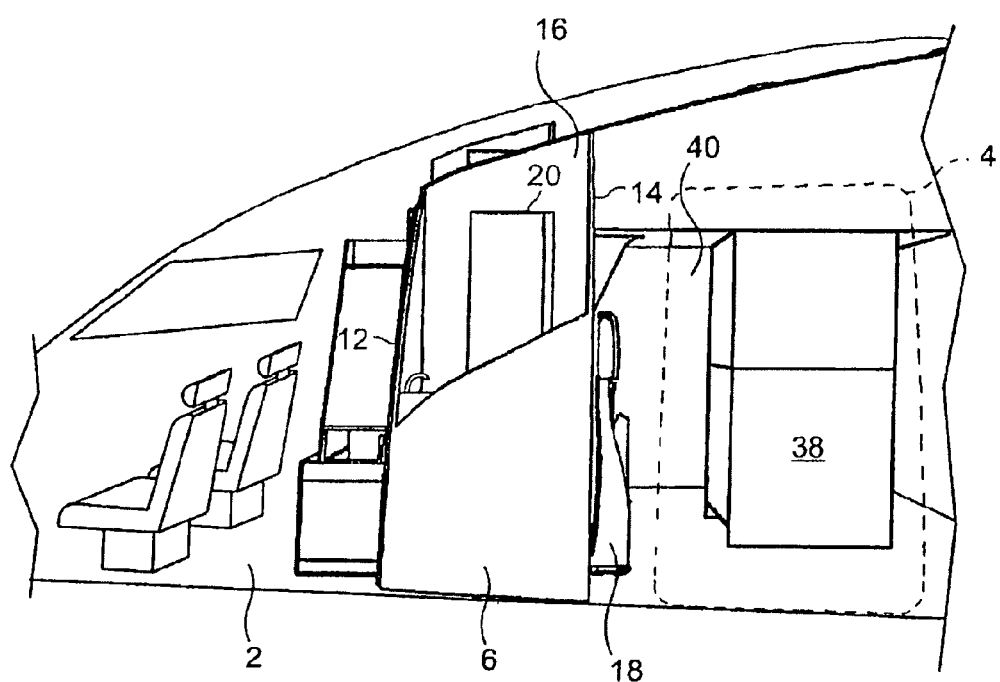
Figure 3:
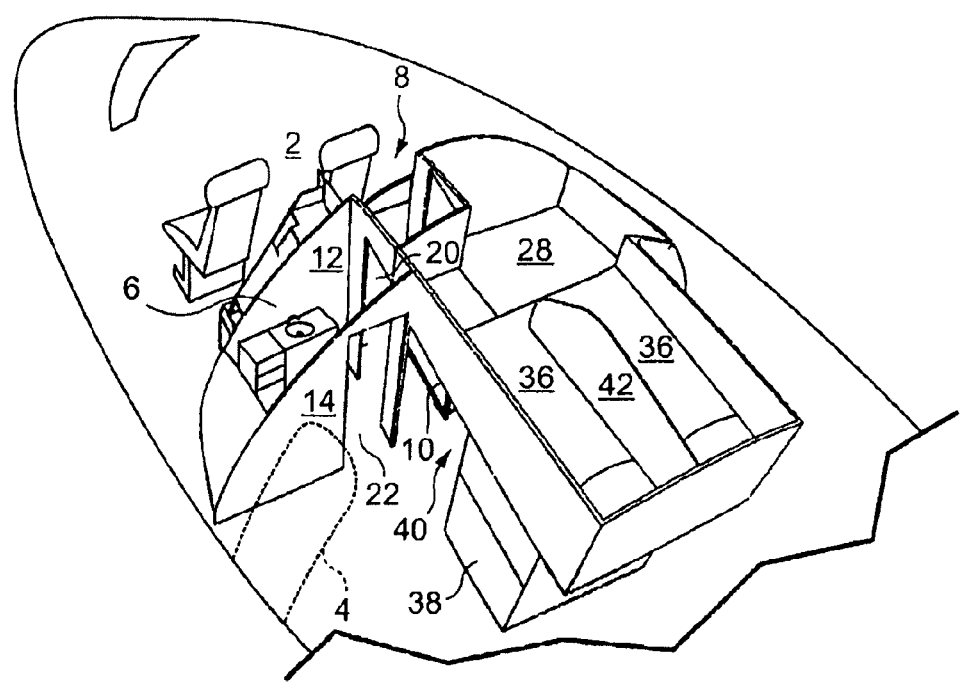
Figure 4:
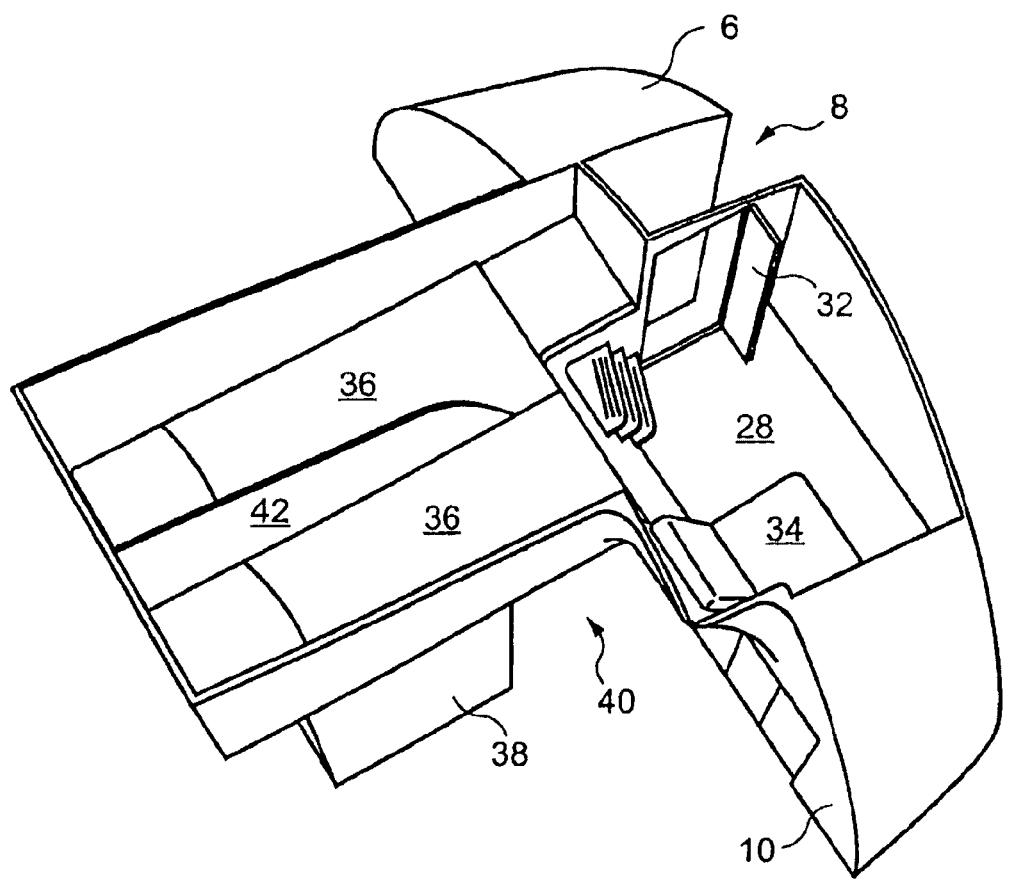

Details and advantages of this invention will become more apparent from the description that follows, presented in reference to the attached schematic drawings on which:

FIG. 1 is a perspective view from above of a rest compartment in an aircraft fuselage front portion according to the invention, FIG. 2 is a perspective view from the side corresponding to the view from above of FIG. 1, FIG. 3 is a perspective view showing the front portion of the aircraft according to the invention from a first angle of perspective, FIG. 4 is a perspective view of a rest compartment of the preceding Figures.

A portion of an aircraft cockpit 2 can be seen on FIGS. 1 to 3. Here it is a matter of a cockpit that is entirely standard, and therefore known to the individual skilled in the art. For this reason, it is pointless to describe it in detail here.

The aircraft described here is an aircraft for the commercial transport of passengers. It involves in particular an aircraft able to transport more than one hundred passengers. A boarding door 4 allows the passengers to access a passenger cabin of the aircraft.

When a passenger enters the aircraft through boarding door 4, he finds, to his left and in the following order, a lavatory 6, an aisle 8 for access to cockpit 2, and a storage module 10. These various elements separate cockpit 2 from the passenger cabin.

Lavatory 6 comprises, in standard manner, a crosswise wall 12 separating lavatory 6 from cockpit 2, a crosswise wall 14 separating lavatory 6 from the passenger cabin, and a longitudinal wall 16 separating lavatory 6 from aisle 8. In standard manner, a seat 18 is placed crosswise wall 14 on the passenger cabin side.

In original manner, lavatory 6 comprises two access doors. A first access door 20 makes it possible to access lavatory 6 from aisle 8. A second access door 22 is implemented in crosswise wall 14 and makes it possible to access lavatory 6 from the passenger cabin. Second access door 22 for lavatory 6 is arranged next to seat 18 intended to accommodate a member of the crew of the aircraft during the takeoff and landing phases.

For reasons of clarity, certain doors are not shown on the Figures. Only the corresponding openings are shown. These openings then bear the reference number assigned to the corresponding door in the description.

Aisle 8 is between lavatory 6 and storage module 10. It separates these two elements by creating a passage between them allowing access to cockpit 2. A first aisle door 24 makes it possible to isolate aisle 8 from the passenger cabin. As for a second aisle door 26, it makes it possible to isolate aisle 8 from cockpit 2. These two doors are arranged at the ends of aisle 8. In this way, first access door 20 for lavatory 6 implemented in longitudinal wall 16 of lavatory 6 is between first aisle door 24 and second aisle door 26.

Storage module 10 makes it possible to store carts used for serving meals and drinks to the passengers. These carts are better known by the English term "trolley," and this term will be used henceforth to designate them. Storage module 10 thus comprises a compartment making it possible to store six trolleys, for example.

The fuselage front portion described here and shown in the drawings also comprises a rest compartment that can accommodate, in the embodiment shown, two pilots in lying-down position.

Access to the rest compartment is gained from aisle 8. This access is opposite first access door 20 for lavatory 6. The rest compartment is accessed from aisle 8, first by accessing a landing 28 laid out above the compartment for the storage module intended to accommodate trolleys.

Landing 28 is at a height higher than the floor of aisle 8. In order then to allow an easy access to landing 28, it is provided to lay out a staircase for access to the said landing 28. This staircase 30 preferably has a very small space requirement and encroaches as little as possible on aisle 8. It is proposed here to have a staircase comprising several steps. Each step is in the form of a plank and is assembled pivoting around a horizontal, in this case also longitudinal, axis. Each step then can pivot 90°. In a first position, all the steps are vertical. Staircase 30 then is out of service. In the other pivoted position, the steps are horizontal. There then is a series of steps arranged one above the other. Staircase 30 then is deployed and makes it possible to access landing 28. Two handrails preferably are provided to aid in climbing or descending staircase 30.

Above staircase 30, a door 32 is provided for isolating aisle 8 from the rest compartment, and more precisely from the area of the rest compartment located at landing 28. As shown on FIG. 4, this door 32 can be implemented in two panels, or shutters, jointed with respect to one another along a vertical axis.

The handrails mentioned above for aiding in climbing or descending the staircase are arranged, for example, on both sides of door 32. An advantageous embodiment provides that these handrails can be retracted inside the wall on which they are located. In this way, when they are retracted, unnecessary protrusions in aisle 8 are avoided. The movement of these handrails preferably is coordinated with that of staircase 30. In this way, when the steps of staircase 30 are deployed, the handrails come out of their wall and when the staircase goes into retracted position, the handrails automatically retract into the corresponding wall.

A seat 34 can be arranged at landing 28. This seat is fastened, for example, onto a vertical wall surrounding landing 28 the same way that seat 18 is fastened to crosswise wall 14. A very comfortable seat 34 can be provided here, the back of which possibly is reclining.

Landing 28 makes it possible to access two berths 36. These two berths extend longitudinally relative to the aircraft. They are arranged on both sides of the longitudinal median line of this aircraft. These berths 36 extend from storage module 10 to the rear of the aircraft. These berths 36 are arranged at a height sufficient to allow walking underneath. Indeed, it is advisable to be able, on the one hand, to access the trolleys stored in storage module 10, but on the other hand, during boarding and deplaning of passengers, it is provided to walk in front of storage module 10 (and therefore beneath berths 36).

A second storage module 38 arranged to the rear of first storage module 10 and separated from the latter by a crosswise aisle 40 is noted on the drawings.

This configuration with two storage modules arranged one behind the other and separated by a crosswise aisle is entirely standard in an aircraft, in particular an aircraft comprising a passenger cabin in which access to the seats is gained through two longitudinal aisles. The second storage module then is between the two longitudinal aisles that open into crosswise aisle 40. The latter usually is in the extension of boarding door 4, as shown in the embodiment in the drawings.

In the preferred embodiment shown in the drawings, berths 36 extend above crosswise aisle 40 and above second storage module 38. These berths 36 protrude only very slightly into the passenger cabin, beyond second storage module 38. This advantageous position of the berths makes it possible to use a space unused until now on aircraft of the prior art. It is noted, moreover, that this position supported on the monument structures, here storage modules 10 and 38, enables it to be easily adapted to the known structures of the aircraft of the prior art.

Moreover, it is noted on the Figures that the two berths 36 are separated from one another by a separating partition 42 that allows each of the pilots on a berth 36 to be isolated from the other pilot occupying the adjacent berth 36.

It also is noted that access to the rest compartment from cockpit 2 can be gained hidden from the view of the passengers in the passenger cabin. Indeed, if first aisle door 24 is closed, a pilot can walk through second aisle door 26 and access the rest compartment by going through access door 32.

Under certain conditions, the rest compartment can include both lavatory 6 and aisle 8. Indeed, when the two aisle doors 24 and 26 are closed, as is second access door 22 to lavatory 6, the space formed by aisle 8 and lavatory 6 can be used by a pilot for changing clothes. This space is a private space that can be separated from landing 28 when door 32 also is closed. A pilot then has a very large space as compared to any that currently is offered in the rest compartments for aircraft pilots for changing clothes, and this in complete privacy.

In order to thus increase the space available for the pilots, there are used, by virtue in particular of the presence of the two doors for access to lavatory 6, common access zones that can be made private at certain times at the will of the pilots.

In order to ensure the security of the zone occupied by the pilots, it is preferable that the doors separating this zone from the passenger cabin are reinforced. It also can be provided that the separating walls are reinforced walls. Thus, first aisle door 24 and second access door 22 for lavatory 6 preferably are reinforced doors. The walls in which these doors are mounted themselves preferably are reinforced walls. A reinforcement also can be provided under berths 36.

Given that lavatory 6 is accessible to passengers, it is advisable also to provide a reinforcement of first access door 20 for lavatory 6 and of corresponding longitudinal wall 16. In that way there is obtained a good protection of the zone in which the pilots are located during a flight. In the case of the aircraft described here, the zone in which the pilots are located corresponds to cockpit 2, lavatory 6, aisle 8, as well as the rest compartment described above.

With regard to the reinforcement of the cockpit and of the rest compartment for the safety of the pilots, it also can be contemplated to reinforce only first access door 20 for lavatory 6 and first aisle door 24, as well as possibly the corresponding walls.

As becomes apparent from the foregoing, lavatory 6 is accessible on the one hand to the passengers and on the other hand to the pilots. It is possible to provide a system of reservation of lavatory 6 from the cockpit. Thus, a system for detection of presence can indicate whether or not lavatory 6 is occupied. When it is unoccupied, a pilot then, from the cockpit, can lock second access door 22 that separates the lavatory from the passenger cabin.

It likewise can be provided that when this second access door 22 for lavatory 6 is locked from cockpit 2, first access door 20 for lavatory 6 itself is locked so as to allow access to lavatory 6 by the pilots. Various methods of managing the occupancy of lavatory 6 can be contemplated.

The configuration of the front portion of the fuselage of the aircraft described above has numerous advantages. Among the most important, it is noted that the pilots benefit from a very spacious rest compartment that (hardly) encroaches on the space of the passenger cabin. Lavatory 6 serving the passengers and the pilots that is found in aircraft of the prior art is retained, but its configuration with the two access doors enable an entirely new and innovative utilization making it possible to enhance the comfort of the pilots in the rest compartments very appreciably without penalizing the space devoted to the passengers. The original manner of accessing the rest compartment makes it possible to maintain, at the first storage module (and also at the second storage module) a place for all the trolleys found in an aircraft of the prior art. Moreover, although arranged in the upper portion of the aircraft, the berths do not come to encroach on the space used in the aircraft of the prior art for storage of the baggage that the passengers usually carry with them during a flight, that is, the number of baggage bins is identical for two similar airplanes, one from the prior art and the other according to this invention.

The embodiment described above, for the rest compartment, meets all the current standards relating to the space and the isolation of the rest compartments intended for the pilots. The available space, in particular in the area allowing for the changing of clothes, very appreciably exceeds the requirements of the standards and all known configurations of the prior art.

This invention is not limited to the preferred embodiment described above by way of non-limiting example. It also relates to all the embodiment variants within the capacity of the individual skilled in the art in the context of the claims below.

Thus, for example, the proposed embodiment is particularly advantageous because the arrangement of the berths makes it possible not to encroach on the passenger cabin. However, the context of the invention would not be exceeded with a rest compartment encroaching extensively on the passenger zone. Of course, the invention is not limited to an aircraft fuselage front portion comprising a rest compartment in which two longitudinally arranged berths are located. The position of the berths can be different, as can the number of berths.

The invention claimed is:

1. An aircraft fuselage front portion comprising:
   a cockpit;
   a lavatory;
   an aisle for access to the cockpit running alongside the lavatory; and
   a rest compartment with at least one berth for at least one pilot,
   the aisle running alongside the lavatory comprising an aisle door that separates the aisle in relation to the cockpit and a second aisle door making it possible to close off access to a passenger cabin, and access to the rest compartment being gained from the aisle, between the aisle door and the second aisle door,
   wherein the lavatory comprises first and second lavatory access doors, the first lavatory access door allowing direct access to the lavatory from the aisle in a zone between the aisle door and the second aisle door, and the second lavatory access door making it possible to access the lavatory from the passenger cabin.

2. An aircraft fuselage front portion according to claim 1, wherein the access to the rest compartment faces the first lavatory access door for the lavatory.

3. An aircraft fuselage front portion according to claim 1, wherein the aisle for access to the cockpit is arranged between the lavatory and a monument.

4. An aircraft fuselage front portion according to claim 3, wherein the monument comprises a low compartment for storage of carts, and an access landing for access to at least one berth is implemented in the monument above the storage compartment for carts, the access landing being at a height intermediate between the floor of the aisle for access to the cockpit and the berth.

5. An aircraft fuselage front portion according to claim 3, wherein a second monument is arranged opposite the first monument, and an aisle crosswise in relation to the aircraft separates the first and second monuments, and at least one berth extends above the crosswise aisle and above the second monument.

6. An aircraft fuselage front portion according to claim 1, wherein the rest compartment comprises two berths.

7. An aircraft fuselage front portion according to claim 1, wherein doors and walls separating the lavatory, the cockpit, and the rest compartment from the passenger cabin are reinforced.

8. An aircraft fuselage front portion according to claim 7, wherein the first lavatory access door for the lavatory and a wall surrounding the lavatory also are reinforced.

9. An aircraft, comprising a fuselage front portion according to claim 1.

* * * * *